United States Patent [19]

Francioni

[11] Patent Number: 4,558,777
[45] Date of Patent: Dec. 17, 1985

[54] DEVICE FOR TRANSFERRING BISCUITS AND CONFECTIONERY PRODUCTS IN GENERAL

[75] Inventor: Renzo Francioni, Grignasco, Italy

[73] Assignee: Cavanna S.p.A., Prato Sesia, Italy

[21] Appl. No.: 416,597

[22] Filed: Sep. 10, 1982

[30] Foreign Application Priority Data

Dec. 11, 1981 [IT] Italy ............................. 25530 A/81

[51] Int. Cl.$^4$ ............................................ B65G 47/31
[52] U.S. Cl. .................................. 198/461; 198/463.2
[58] Field of Search .............. 198/461, 491, 460, 459, 198/444, 489

[56] References Cited

U.S. PATENT DOCUMENTS

| | | |
|---|---|---|
| 2,818,157 | 12/1957 | Howell . |
| 3,572,495 | 3/1971 | Luginbuhl ............................ 198/461 |
| 3,753,484 | 8/1973 | Aiuola et al. . |
| 4,006,813 | 2/1977 | Fluck ............................ 198/491 X |
| 4,228,888 | 10/1980 | Bruno ............................ 198/461 |
| 4,369,875 | 1/1983 | Schmitz ............................ 198/461 X |

FOREIGN PATENT DOCUMENTS

| | | |
|---|---|---|
| 1461929 | 11/1980 | Fed. Rep. of Germany . |
| 2454423 | 4/1979 | France . |
| 553709 | 9/1973 | Switzerland . |

OTHER PUBLICATIONS

European Search Report, place of search—The Hague—dated Mar. 14, 1983, by Examiner Van RoUeghem F. M.

Primary Examiner—Joseph E. Valenza
Assistant Examiner—Dennis Williamson
Attorney, Agent, or Firm—Fleit, Jacobson, Cohn & Price

[57] ABSTRACT

A device for transferring biscuits and confectionary products in general from a first continuous belt conveyor to a second in-line comparmented belt conveyor allows transfer rates of 400 to 500 biscuits per minute to be achieved, without breakage of the biscuits, blockages or stoppages of the operation. The device includes a bladed chain conveyor having an active pass which extends in the same direction as the continuous conveyor above at least an end section thereof laterally of the biscuits, and pusher means for displacing laterally one biscuit at a time towards the active pass of the bladed chain conveyor.

7 Claims, 1 Drawing Figure

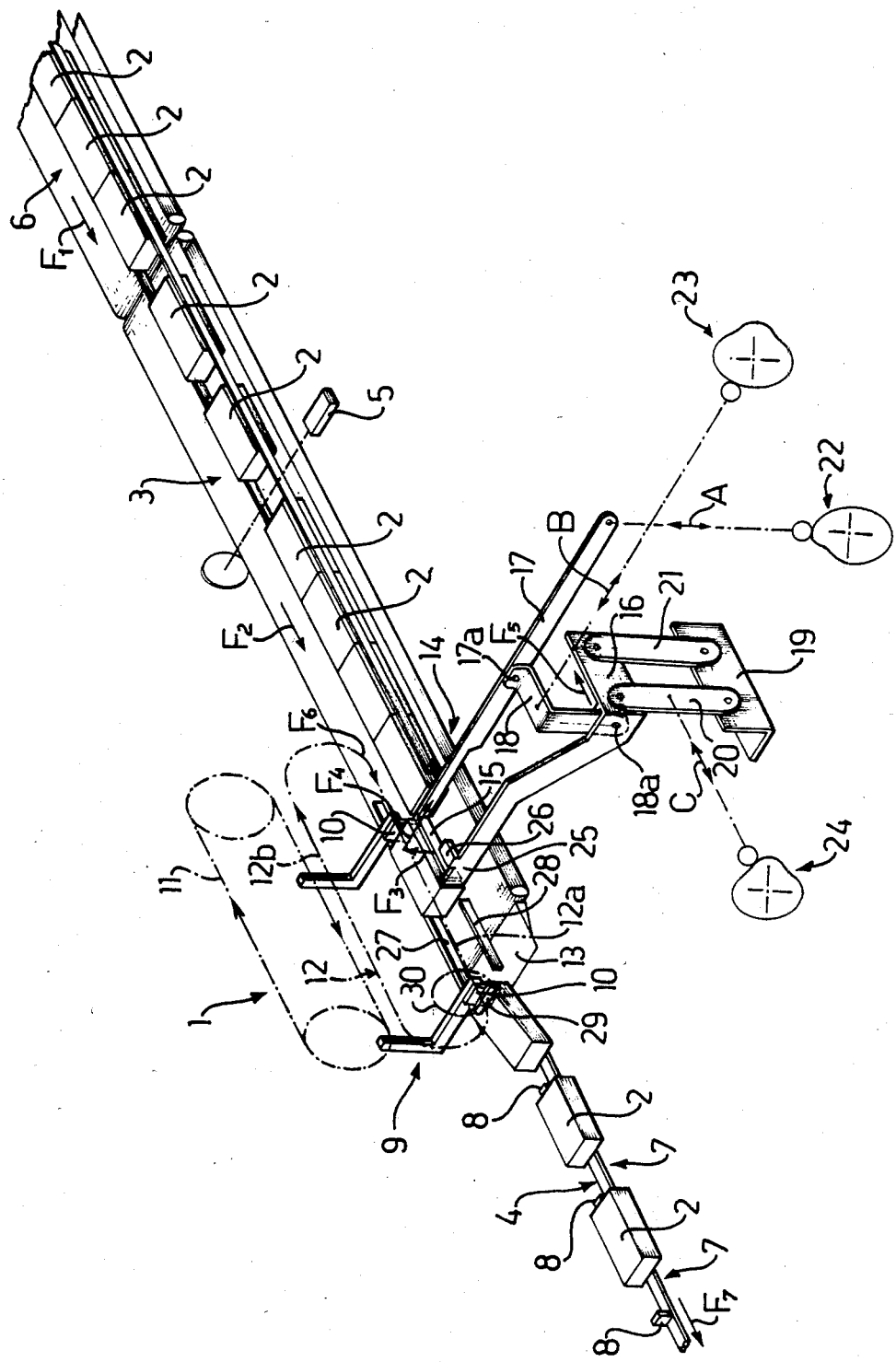

DEVICE FOR TRANSFERRING BISCUITS AND CONFECTIONERY PRODUCTS IN GENERAL

BACKGROUND OF THE INVENTION

1. Field of the Invention

The present invention relates to a device for transferring biscuits, and confectionery products in general, from a first continuous belt conveyor to a second in-line compartmented belt conveyor.

2. Discussion of the Art

As taught by the prior art, the biscuits are arranged in a mutual head-to-tail alignment on the continuous belt by, for example, controlling the speed of another continuous belt which is located upstream of the first and is supplied with biscuits from a production unit, the biscuits leaving the latter cooked, covered in chocolate, or otherwise prepared.

On the compartmented belt, the biscuits are each located in a respective compartment and are thus arranged at equally spaced intervals from each other, ready to be advanced, as taught by the prior art, to a packaging machine where the biscuits are individually packaged, for example, wrapped in cellophane.

Clearly, it is necessary to transfer the biscuits from the continuous belt to the compartmented belt.

At present, according to one solution in use, the conveyor belts are installed with respective end sections placed side by side and a coplanar shelf is formed between the adjacent end sections. As the biscuits on the continuous belt reach a stop formed at the end thereof, they are displaced one at a time from the continuous belt, across the shelf towards the compartmented belt, and into respective compartments, by a pusher.

This solution, although advantageous from various points of view, has the disadvantage of not permitting a high rate of transfer and, in particular, it does not lend itself to transfers of more than 60–70 biscuits per minute when the pusher carries out a simple reciprocating movement, or not more than 120–130 biscuits per minute when the pusher carries out a rectangular movement, that is, with its return stroke above the belt. This low rate is due to the long stroke of the pusher (a stroke which cannot be reduced because of the general overall dimensions of the belt conveyors) and the low velocity of the pusher (a velocity which cannot be increased for risk of crushing the biscuits).

According to another solution in use, the continuous belt is installed with its end converging with the compartmented belt so as to form a small angle of, for example, 15° therewith. A substantially triangular shelf is formed between the end of the continuous belt and the compartmented belt and is coplanar therewith. The biscuits carried by the continuous belt take up positions across the shelf against equally-spaced partitions provided on the compartmented belt to define the compartments themselves, and are at the same time pushed into the compartments by a pair of cams acting reciprocatingly on the biscuits.

Although allowing an increase in the transfer rate of the biscuits, for example, up to about 300 biscuits transferred per minute, this solution has several disadvantages which have had to be accepted until now.

In particular, a first disadvantage results from the fact that each biscuit is pushed across the triangular shelf by the rest of the biscuits aligned on the continuous belt so as to take up a position against the partition of the compartmented belt. Since sticky deposits may form on the shelf, particularly in the case of chocolate-coated biscuits and the like, the unwelcome disadvantage of blockage and slowing of the biscuits on the shelf may easily occur.

Another disadvantage results from the need to provide complicated disappearing guide means, for guiding the biscuits in the section between the end of the continuous belt and the partition of the compartmented belt, which disappear in synchronism with the action of the cams.

As well as this, the above-mentioned solution is unfavorably large in plan due to the substantially Y-shaped arrangement of the conveyor belts relative to each other.

Finally, the transfer rate which can be achieved, although greater than the solution discussed previously, is still insufficient to satisfy the requirements of large-scale biscuit production.

SUMMARY OF THE INVENTION

The problem behind the present invention is that of devising a device of the type specified which has such structural and functional characteristics as to satisfy the above requirement, while at the same time overcoming the disadvantages mentioned with reference to the prior art.

This problem is solved by a device of the type specified which is characterised in that it comprises a bladed chain conveyor having an active pass which extends in the same direction as the continuous belt above at least an end section thereof laterally of the biscuits, and pusher means for the lateral displacement of one biscuit at a time towards the active pass of the bladed chain conveyor.

BRIEF DESCRIPTION OF THE DRAWINGS

Further characteristics and advantages of the device according to the present invention will become apparent from the following description of a preferred embodiment, given by way of non-limiting example, with reference to the one appended drawing which is a schematic perspective view of a device according to the invention.

DETAILED DESCRIPTION OF THE INVENTION

With reference to the appended drawing, by 1 is generally indicated a device for transferring biscuits, or confectionery products in general, all indicated by 2, from a first continuous belt conveyor 3 to a second compartmented belt conveyor 4 which products 2 are aligned with their ends adjacent, and are supported by a frame which is entirely conventional and is not shown so as not to encumber the drawing.

The device 1 is located between adjacent ends of the belts 3, 4.

On the continuous belt 3 is a line of biscuits 2 which in the section between the device 1 and a photo-electric cell 5 are arranged in mutual head-to tail alignment. The belt 3 is supplied continuously, in a conventional manner, with biscuits 2 from another belt conveyor 6 upstream of the belt 3. The speed of the belt 6 is controlled conventionally by the photo-electric cell 5 so that the biscuits 2 aligned head-to-tail between the device 1 and the photo-electric cell 5 always fill the section completely.

The belt 3 and the belt 6 are provided with entirely conventional guide means, shown only in part, which are supported by the frame laterally and above the biscuits 2 for keeping them aligned correctly on the belts.

The compartmented belt 4 carries a biscuit 2 in each of its compartments 7. The compartments 7 of the belt 4 are defined by the spaces between equally-spaced partitions 8 arranged along the belt 4 in an entirely conventional manner.

In general, the belt 3 is supplied by the belt 6 with biscuits from a production unit, not shown, in which the biscuits are cooked or coated with chocolate and the like, while the belt 4 carries the biscuits to a packaging machine, not shown, in which the biscuits are, for example, individually wrapped in cellophane.

The device 1 according to the invention comprises a bladed chain conveyor, generally indicated at 9, which includes a plurality of blades 10 supported at equally-spaced intervals by an endless chain, schematically indicated by 11, and is movable along a closed chain path 12 having an active pass 12a and a return pass 12b.

The active pass 12a of the closed chain path 12 of the blades 10 of the conveyor 9 extends in the same direction as the belt 3 above an end section thereof laterally of the line of biscuits 2, and above a shelf 13 which is coplanar with the end of the continuous belt 3 and forms an extension thereof towards the compartmented belt 4.

The device 1 according to the invention also includes pusher means, generally indicated at 14, for pushing the biscuits 2, one at a time, towards the active pass 12a.

These pusher means 14 include a pusher 15 which is mounted for movement in a rectangular cycle transverse the continuous belt 3 on an element 16 which is, in its turn, movable reciprocatingly in the direction of the continuous belt 3.

In particular, in the example illustrated, the pusher 15 is fixed at one end to a substantially horizontal rod 17 pivoted at an intermediate point 17a to the upper end of a substantially vertical rod 18 which is pivoted at its lower end 18a to the element 16.

The element 16 is supported on a fixed element 19, which is rigid with the supporting frame, by two substantially vertical and parallel rods 20, 21 which form an articulated parallelogram with the element 16 and the fixed element 19.

Cam drive means, generally indicated at 22,23,24, are operatively connected to the free end of the rod 17, to an intermediate point on the rod 18, and to an intermediate point on the rod 20, respectively, so as to displace them reciprocatingly in respective directions which are vertical (see arrow A), horizontal transverse the belt 3 (see arrow B), and horizontal parallel to the belt 3 (see arrow C).

The element 16 is provided with a stop wall 25 extending over the belt 3 downstream of the pusher 15 relative to the direction of advance of the belt 3. The stop wall 25 is provided with a tile part 26 which faces the line of biscuits 2 so as to partly overlie the first biscuit in the line of biscuits 2.

Two fixed strips 27, 28 are supported by the supporting frame and extend along the active pass 12a as guide means for the biscuits 2. In particular the strip 27 is located on the opposite side of the active pass 12a from the line of biscuits 2 and has the same length as the active pass 12a, while the strip 28 is located on the near side of the active pass 12a and is shorter so as to allow the transfer of each biscuit 2 from the line of biscuits 2 to the active pass 12a of the bladed chain conveyor 9 on operation of the pusher 15.

The device 1 according to the invention also includes a cam 29 which is located in correspondence with the end of the active pass 12a facing the compartmented belt 4 and is rotatable in synchronism with the blades 10 about a circular path 30 so as to strike each biscuit 2 from above.

The operation of the device 1 according to the invention is described below with reference to an initial condition shown in the drawings. The biscuits 2 are conveyed by the belts 6, 3 in the direction of the arrows F1, F2, and take up position against the end of the rod 17 adjacent the pusher 15 as a line of biscuits between the rod 17 and the photo-electric cell 5. The end of the rod 17 adajcent the pusher 15 and the pusher 15 itself, due to the operation of the cam drive means 22, 23, are lifted in the direction of the arrow $F_3$ by a predetermined distance and pulled back in the direction of the arrow $F_4$ relative to the element 16. As soon as the lifting movement has finished, the element 16 is moved in the direction of the arrow $F_5$ by the action of the cam drive means 24, so that the stop wall 25 moves towards the line of biscuits 2 which is advancing towards it in the direction of the arrow $F_2$. The movement of the element 16 is reversed at this point, while the line of products 2 is brought to a halt against the stop 25. More particularly, the first of the biscuits 2 in the line is brought to a halt against the stop 25 and is simultaneously overlain by the tile part 26 which prevents it from rising up undesirably.

At this point the pusher 15, which in the meantime has been lowered again, reverses its movement and advances in the opposite direction to the arrow $F_4$, thus pushing the first biscuit laterally and diagonally out of the line towards the active pass 12a of the bladed chain conveyor 9, where it is intercepted by a blade 10, advanced in the direction of the arrow $F_6$, and then moved positively thereby across the shelf 13 into a compartment 7 of the compartmented belt 4, which carries it away in the direction of the arrow $F_7$. The removal of the biscuit from the blade 10, which conveys it positively, and its fall into the compartment 7 are ensured by the operation of the cam 29 which strikes the biscuit from above at the moment when the blade 10 reaches the end of the active pass 12a facing the compartmented belt 4.

The operating cycle described above is repeated identically in a continuous manner.

It should be noted that the reciprocating movement effected by the pusher 15 in the direction of the arrow $F_4$ and the opposite direction, for displacing each biscuit from the line of biscuits towards the active pass 12a of the path 12 of the conveyor 9, may be limited, for example, to slightly more than half the width of the biscuit itself, which still allows a blade 11 to engage the biscuit safely so as to displace and convey it positively and securely towards the compartmented belt 4.

The main advantage of the device according to the invention lies in the fact that it allows the achievement of a transfer rate of, for example, 400–500 biscuits being transferred from the continuous belt to the compartmented belt per minute, which has never been achieved until now. This has been obtained by virtue of the fact that the biscuits may be displaced laterally by an extremely small amount upon operation of the pusher, for example, by slightly more than half their width, so as to be immediately and positively thrust by the blades towards the compartmented belt. In fact, because of this, the speed of the pusher may be kept relatively low, which is entirely to the advantage of the integrity of the biscuits, while the positive thrust on the biscuits by the blades overcomes the hesitancy and possible sticking of the biscuits themselves independently of whether or not sticky deposits form.

A further advantage of the device according to the invention results from the fact that the lateral displacement of each biscuit relative to the line, upon operating of the pusher means, occurs entirely above the continuous belt so that crumbs or particles of the coating or filling which become detached from the biscuit when this comes into engagement with the stop, or is engaged by the pusher or the blades, fall onto the belt and are carried away by it without any possibility of their accumulating in situ.

These sticky particles or crumbs may then be easily removed by a scraper located above the return pass of the belt.

In this way, the desired transfer of the biscuits may be carried out uninterruptedly for long periods without needing to stop for cleaning or maintenance.

I claim:

1. A device for transferring biscuits and confectionery products from a first continuous belt conveyor to a second in-line compartmented belt conveyor, said device comprising a bladed chain conveyor having an active pass extending in the same direction as the continuous belt above at least an end section thereof laterally of said products, pusher means having an element movable reciprocatingly in the direction of the continuous belt and a pusher mounted on said element for movement transverse to the continuous belt in a rectangular cycle for displacing one said product at a time diagonally towards said active pass of the bladed chain conveyor; and a cam located in correspondence with the end of said active pass of the bladed chain conveyor, said cam being rotatable in synchronism with the blades of said blade conveyor to strike each product from above to aid in the removal of the product from the blade.

2. A device as defined in claim 1, wherein said device further includes guide means for said products along the active pass of the bladed chain conveyor.

3. A device as defined in claim 1, wherein said element is provided with a stop wall extending over the continuous belt downstream of said pusher relative to the direction of advance of said belt.

4. A device as defined in claim 3, wherein said stop wall is provided with a tile part facing upstream for overlying at least a part of at least the immediately adjacent product on said continuous belt.

5. A device as defined in claim 1, wherein said device further includes a cam located in correspondence with the end of said active pass of the bladed chain conveyor, said cam being rotatable in synchronism with the blades of said blade conveyor to strike each product from above.

6. A device as defined in claim 1, wherein said device further includes a shelf which is coplanar with the end of the said continuous belt and constitutes an extension of the latter towards said compartmented belt, the active pass of said bladed chain conveyor extending above said shelf.

7. A device according to claim 1 wherein said cam is connected to the bladed chain conveyor.

* * * * *